United States Patent [19]

Benedetti et al.

[11] Patent Number: 5,400,631

[45] Date of Patent: *Mar. 28, 1995

[54] METHOD TO OBTAIN ON THE COLD STATE SINGLE FINISHED SECTION FROM COLD SINGLE MULTI-SECTION ELEMENTS, AND RELATIVE MACHINE

[75] Inventors: Gianpietro Benedetti, Campoformido; Alfredo Polino, Fogliano Di Redipuglia, both of Italy

[73] Assignee: Danieli & Officine Meccaniche S.p.A., Buttrio, Italy

[*] Notice: The portion of the term of this patent subsequent to Feb. 8, 2011 has been disclaimed.

[21] Appl. No.: 147,440

[22] Filed: Nov. 5, 1993

Related U.S. Application Data

[63] Continuation of Ser. No. 914,328, Jul. 17, 1992, abandoned.

[30] Foreign Application Priority Data

Jul. 31, 1991 [IT] Italy ............... UD91A0121
Nov. 26, 1991 [IT] Italy ............... UD91A0196
Apr. 28, 1992 [IT] Italy ............... UD91A0066

[51] Int. Cl.[6] ............ B21B 15/00; B21B 31/08; B26D 9/00
[52] U.S. Cl. ................... 72/161; 72/203; 72/239; 29/413; 83/425.2
[58] Field of Search ............... 72/129, 130, 161, 164, 72/186, 187, 197, 203, 204, 275, 289, 239; 29/413, 414; 83/332, 344, 425.2, 481, 503, 706

[56] References Cited

U.S. PATENT DOCUMENTS 1,424,465  8/1922  Gail ........................... 72/203

(List continued on next page.)

FOREIGN PATENT DOCUMENTS 750785  6/1933  France .

(List continued on next page.)

OTHER PUBLICATIONS

Mhorophyubebar Npokatka—(Multipass Rolling—Separation), pp. 160–161, 1987.
Rolling Mills, p. 276, 1958.
USSR Inventors' Certificate Specification No. 610577 Claims, 1978.

*Primary Examiner*—Lowell A. Larson
*Assistant Examiner*—Thomas C. Schoeffler
*Attorney, Agent, or Firm*—Antonelli, Terry, Stout & Kraus

[57] ABSTRACT

Method to obtain in the cold state single finished sections (11) from substantially cold single multi-section elements (12) produced by hot rolling, extrusion or drawing, the single multi-section element (12) consisting of at least two finished sections (11) (angle irons, angle irons with unequal sides, Z-sections, T-sections, flats, etc.) positioned side by side and connected together lengthwise along the terminal part of an edge, the sections (11) being separated by a web (21), the cold single multi-section element (12) being positioned and undergoing the splitting of the web (21) from the sections (11), the edges of the finished sections (11) facing the web (21) after splitting being subjected to a re-gauging operation, the finished sections (11) being then straightened and made linear at the same time. Machine to obtain in the cold state single finished sections (11) from single multi-section elements (12) produced by hot rolling or extrusion/drawing, the single multi-section element (12) consisting of at least two finished sections (11) (angle irons, angle irons with unequal sides, Z-sections, T-sections, flats, etc.) positioned side by side and connected together lengthwise along the terminal part of an edge by a web (21), the machine comprising in sequence at least one feeding and positioning assembly (36), at least one splitting assembly (20) and at least one re-gauging assembly (29).

22 Claims, 8 Drawing Sheets

U.S. PATENT DOCUMENTS

| | | | |
|---|---|---|---|
| 1,977,285 | 10/1934 | McCleery . | |
| 2,216,869 | 10/1940 | Yoder et al. | 72/203 |
| 2,335,334 | 11/1943 | Yoder . | |
| 3,254,400 | 6/1966 | Gordon | 72/203 |
| 3,416,347 | 12/1968 | Walsh et al. | 72/129 |
| 3,457,752 | 7/1969 | Hagemann . | |
| 3,800,648 | 4/1974 | Nishiyori et al. | 83/481 |
| 4,091,651 | 5/1978 | Rose et al. | 72/275 |
| 4,226,151 | 10/1980 | Littley et al. | 83/481 |
| 4,866,967 | 9/1989 | Sporenberg et al. | 72/129 |
| 4,872,330 | 10/1989 | Nonini | 72/203 |
| 5,284,042 | 2/1994 | Benedetti | 72/204 |

FOREIGN PATENT DOCUMENTS

| | | |
|---|---|---|
| 1531186 | 6/1968 | France . |
| 957713 | 2/1957 | Germany . |
| 1962553 | 6/1971 | Germany . |
| 2346703 | 3/1975 | Germany . |
| 8611389 | 7/1986 | Germany . |
| 57-058902 | 4/1982 | Japan . |
| 606202 | 1/1985 | Japan . |
| 1168847 | 10/1969 | United Kingdom . |
| 173108 | 3/1962 | U.S.S.R. . |
| 481338 | 12/1975 | U.S.S.R. . | fig. 2a fig. 2b fig. 3 fig. 4 fig.6 fig.7 fig. 8 fig. 9 fig.11 fig.12 fig.13 fig.14 fig.15

METHOD TO OBTAIN ON THE COLD STATE SINGLE FINISHED SECTION FROM COLD SINGLE MULTI-SECTION ELEMENTS, AND RELATIVE MACHINE

This application is a Continuation of application Ser. No. 07/914,328, filed Jul. 17, 1992, abandoned.

BACKGROUND OF THE INVENTION

This invention concerns a method and relative machine to obtain in the cold state single finished sections from cold single multi-section elements.

To be more exact, the invention concerns a method and relative machine to obtain in the cold state single finished sections by starting with a cold single multi-section element having a special multiple profile.

The single multi-section element is produced by hot rolling or by an extrusion/drawing process and is then cooled.

The single multi-section element consists of a plurality of substantially finished sections positioned side by side and connected together lengthwise along the terminal part of at least one edge.

The sections consist mainly of angle irons having equal and/or unequal sides.

The method and relative machine of this invention are employed to advantage in obtaining Z-sections, T-sections, flats, etc. from one single multi-section element which contains them.

The present applicants are aware of methods using a hot rolling mill to roll in the hot state at one and the same time one single multi-section element containing a plurality of sections positioned side by side and connected together lengthwise, so as then to obtain, still in the hot state, the splitting of the single sections.

JP 54-33251 discloses single multi-section elements consisting of a plurality of angle irons having equal sides, positioned side by side and connected together lengthwise.

GB 306 A.D. 1910 discloses single multi-section elements consisting of a plurality of round bars positioned side by side and connected together lengthwise.

U.S. Pat. No. 1,977,285 discloses single multi-section elements consisting of a plurality of angle irons having equal sides, or of a plurality of bars having a square base, or of a plurality of channel sections connected together.

JP 60-6202 discloses single multi-section elements consisting of a plurality of angle irons having unequal sides and connected together lengthwise.

GB 1,355,144 discloses single multi-section elements consisting of two T-sections connected together at their central web.

All these single multi-section elements are normally produced with a lengthwise connecting web between the single sections. The single sections constituting the multi-section element have to be split and then re-formed and/or re-shaped and also straightened in the cold state so as to take up their final form.

The present applicants are not aware of machines which split and finish the single component section so as to obtain single finished sections from a cold single multi-section element as described in this invention.

SUMMARY OF THE INVENTION

The present applicants have studied, tested and brought about this invention to overcome the shortcomings of the state of the art and to achieve further advantages.

The main purpose of this invention is to provide a method and relative machine which arrange for cold splitting and successive substantially simultaneous finishing of the single sections defined in the single multi-section element consisting of the plurality of the single sections.

The sections which the invention aims to obtain by cold splitting from a cold multi-section element are flats, angle irons, L-sections, T-sections, V-sections and also like sections and sections which can be likened thereto.

Hereinafter or in the examples we shall show the case of angle irons, but the range to which the invention can be applied is that detailed above.

The machine of this invention can be located downstream of the plant producing in the hot state the single multi-section element consisting of the plurality of single sections connected together lengthwise or can be located at a distance from that plant.

If the machine of this invention is located downstream of the hot-production plant making the single multi-section element, then the machine is located advantageously downstream of the cooling plate and immediately downstream of a drawing assembly but comprises immediately downstream a straightening machine and a shears which shears to size.

According to a variant the machine of this invention is located downstream of the cooling plate; a drawing assembly and a straightening machine are interposed between the cooling plate and the machine of the invention, and a shears which shears to size is located downstream of the machine of the invention.

The cold single multi-section element tends to include warping or deformation irregularly, especially in the zone of its leading end.

For this reason the machine according to the invention comprises upstream a guide assembly which performs the tasks of positioning, guiding and pre-straightening the incoming single multi-section element.

According to a variant a pre-straightening assembly is included instead of the guide assembly or in cooperation therewith.

The machine includes immediately downstream of the guide assembly at least one feeding and positioning assembly which carries out the task of feeding and positioning the single multi-section element properly for the subsequent operations.

At least one first splitting or slitting assembly is comprised immediately downstream of the feeding and positioning assembly and performs the operation of splitting the single multi-section element into its single component sections.

According to a variant a guide assembly and then a second further splitting assembly and lastly a further guide assembly are included downstream of the first splitting or slitting assembly.

After the above operation of splitting the single sections from the single multi-section element has been effected, the single sections may include flash and/or pieces of the connecting web which have remained attached to the edges. For this reason the machine according to the invention includes downstream of the splitting assembly at least one re-gauging assembly which performs the operations of re-gauging and finishing the sections.

An assembly to straighten the single sections leaving the re-gauging assembly may also be included downstream of the latter.

According to a variant the straightening function is entrusted to a further specialist assembly of a known type, which is able to straighten a plurality of finished sections at one and the same time.

The splitting assembly performs the splitting operation by slitting the points of attachment of the connecting webs; this slitting is carried out with upper and lower rotary blades. The cutting edges of the rotary blades act on the connecting web so as to split the various rolled sections and to separate the connecting web at the same time.

According to a variant the splitting assembly carries out the operation of splitting the single sections from the web by rotary blades in two successive steps. In the first step two blades act on one side of the connecting web so as to slit the connecting web along one side alone near the edge of a single section, whereas in the second step another two blades act on the other side of the connecting web.

An assembly to separate and collect the wastes is associated with the splitting assembly and cooperates with suitable slitting and waste-removal means, which may be of a magnetic type, for instance.

According to a variant at least one auxiliary trimming assembly equipped with stationary re-gauging tools is included in addition to, or in replacement of, the re-gauging assembly so as to achieve a better shaping of the single split sections.

According to another variant the auxiliary trimming assembly is equipped with rotary tools.

According to yet another variant, in relation to the splitting assembly including rotary blades, the machine is equipped with a station for quick replacement of the assembly of rotary blades. This quick replacement station is positioned advantageously laterally to the splitting assembly and may be of a type performing replacement with a sliding box or rotary platform or of another known type.

According to a further variant the machine according to the invention comprises splitting assemblies in pairs so that at least one working splitting assembly is available in the event of wear of the other assembly or during replacement of the blades of one of the splitting assemblies.

According to another variant the feeding and positioning assembly too is equipped with a replacement station, positioned laterally to advantage, for speedy replacement of the feeding and positioning assembly.

According to still another variant the machine according to the invention comprises at least two drawing assemblies so that at least one drawing assembly is always available in a working condition.

According to a further variant the re-gauging assembly too comprises a speedy replacement assembly for the quick replacement of the re-gauging tools.

According to another variant an assembly to shear to size the single sections thus produced is included downstream of the re-gauging assembly.

By means of the machine of this invention it is possible to achieve a high output with a great saving of time and simplification of the plant.

The attached figures are given as a non-restrictive example and show some preferred embodiments of the invention as follows:

BRIEF DESCRIPTION OF THE DRAWINGS

FIG. 1b is a plan view of the machine of FIG. 1a;

FIG. 2b shows a variant of FIG. 2a;

FIGS. 5b and 5c show two variants of FIG. 5a;

DETAILED DESCRIPTION OF THE PREFERRED EMBODIMENTS

In the figures the reference number 10 indicates a machine according to this invention to obtain sections, single finished angle irons 11 in this case, from cold single multi-section elements 12.

As we said above, the cold single multi-section element 12 consists of a side-by-side plurality of sections 11, angle irons with equal sides in this case, connected together lengthwise by a web 21 having a thickness between 0.5 and 1.0 mm.

The hot single multi-section element 12 leaving a rolling mill (not shown in the figures) is cooled and sent to a store and then delivered to the machine 10 according to the invention.

Figure 1A:
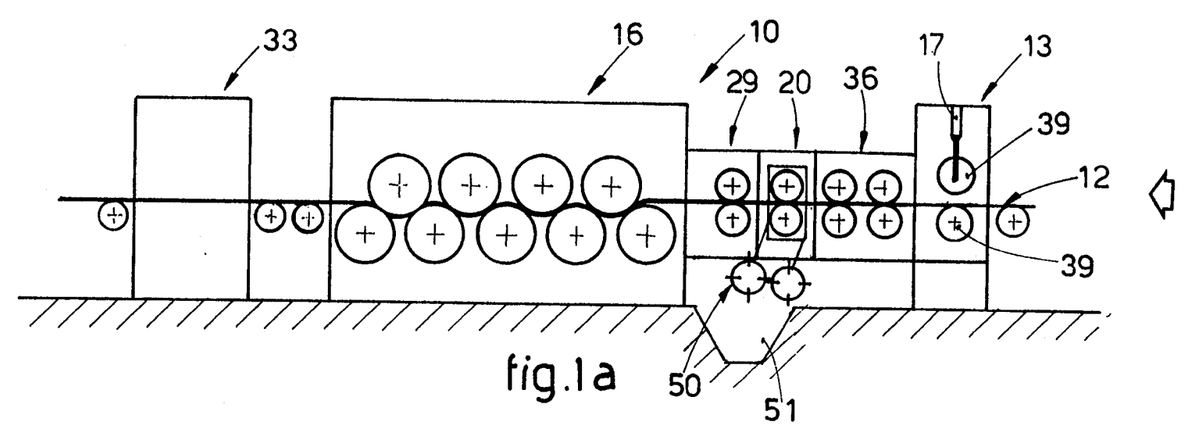
FIG. 1a is a diagrammatic side view of a machine according to a first idea of the embodiment of the invention.
Figure 1B:
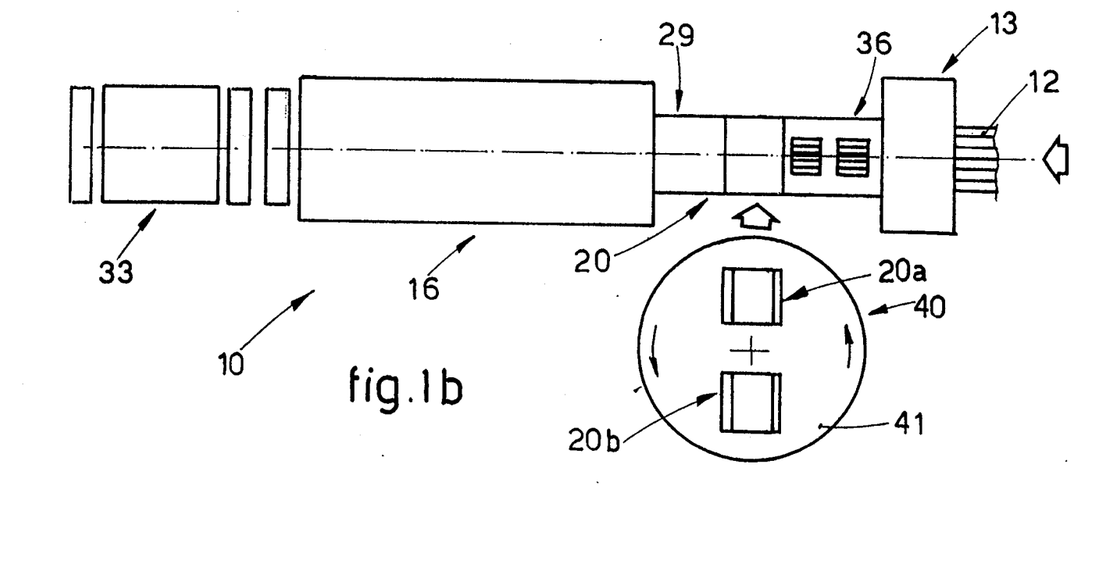

According to a first idea of the embodiment of the invention shown in FIGS. 1a-1b the machine 10 comprises upstream a guide assembly 13, which positions and guides the oncoming single multi-section element 12 towards the inside of a feeding and positioning assembly 36.

Moreover, the guide assembly 13 performs the task of pre-straightening the single multi-section element 12.

FIG. 1a shows a guide assembly 13, which in this example consists of containment rolls 39 capable of reciprocal motion of distancing and approach, the upper roll 39 being driven by cylinder/piston actuators 17 or another known system.

The containment rolls 39 are reciprocally distanced to assist introduction of the single multi-section element 12 into the machine 10. Thereafter the containment rolls 39 are brought reciprocally closer so as to assist positioning and introduction of the single multi-section element 12 into the feeding and positioning assembly 36.

Figure 2A:
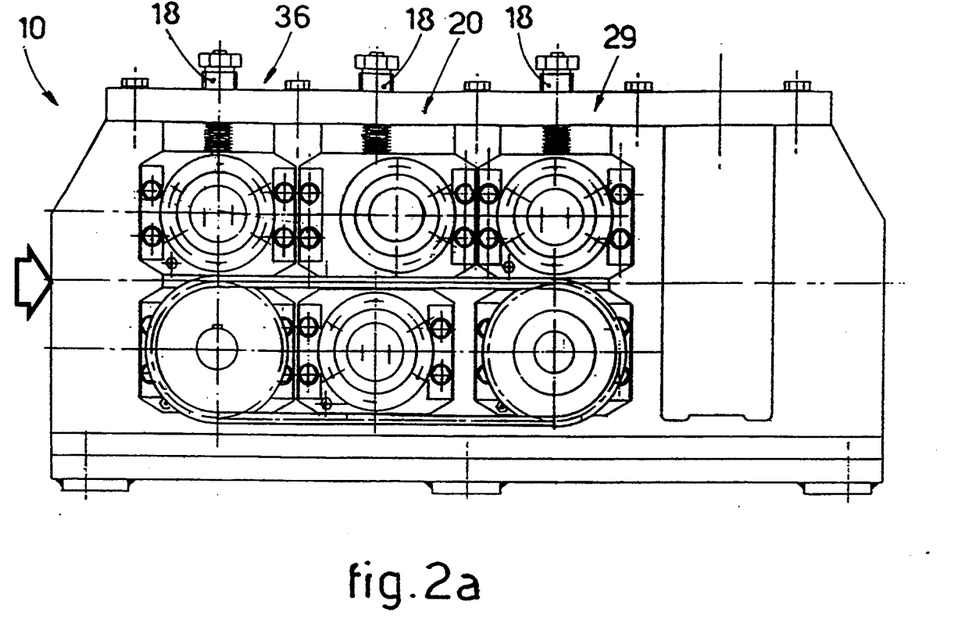
FIG. 2a is a side view of a machine according to a second idea of the embodiment of the invention.
Figure 2B:
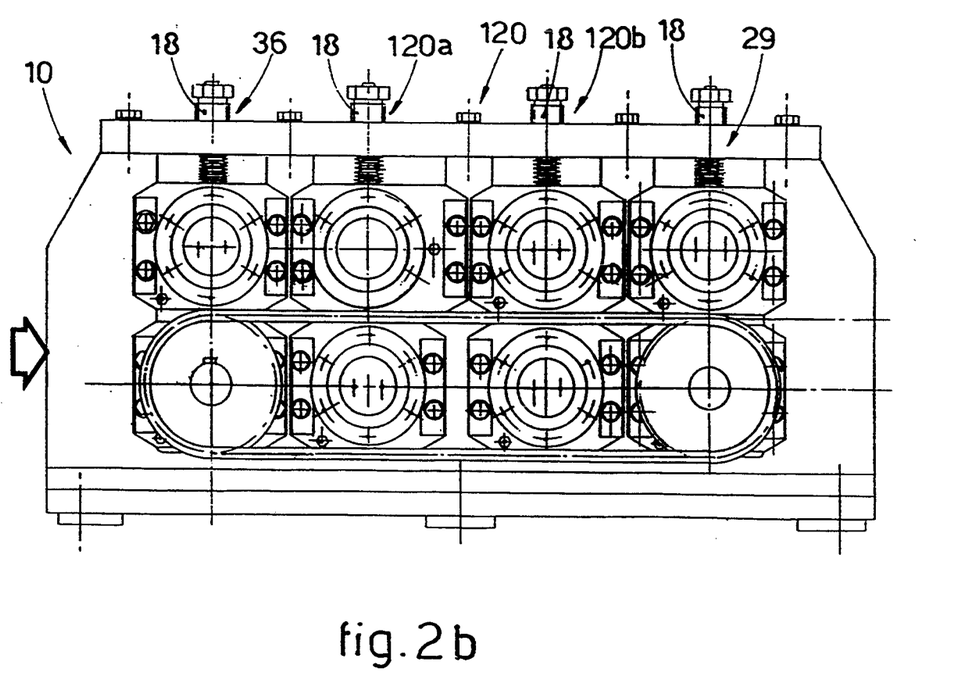

A second idea of the embodiment of the invention provides for the machine 10 to include only one feeding and positioning assembly 36, which carries out also the tasks of guiding and pre-straightening the incoming single multi-section element 12 (see FIGS. 2a and 2b).

Figure 3:
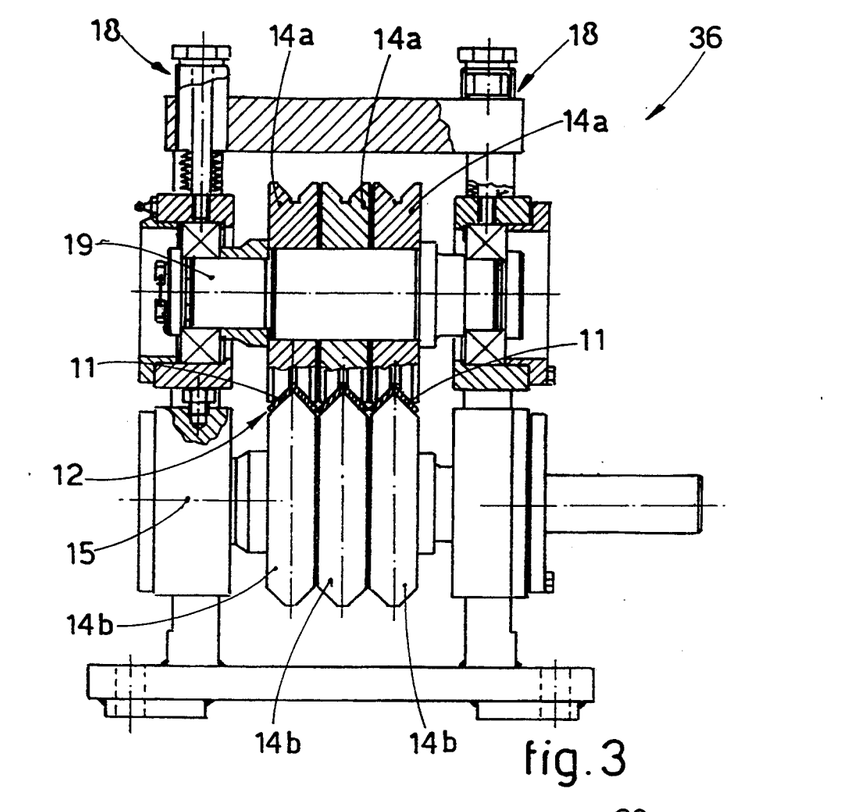
FIG. 3 shows a feeding and positioning assembly according to the invention, partly cutaway crosswise.

FIG. 3 shows (in relation to the machine of FIGS. 2a and 2b) a feeding and positioning assembly 36 suitable for a single multi-section element 12 consisting for example, but not restricted thereto, of three angle irons 11 having equal sides.

This drawing assembly 36 comprises upper retaining rolls 14a and lower retaining rolls 14b so shaped that they mate respectively with the upper surface and lower surface of the single multi-section element 12 so as too keep the element 12 properly positioned and to pre-straighten it at the same time.

The lower retaining rolls 14b are caused to rotate suitably about their axis 15 so as to achieve the correct feed of the single multi-section element 12.

In this example suitable means 18 are included to regulate the distance between centers of the rolls 14 and are of a threaded bolt type cooperating with a shaft 19 of the upper retaining rolls 14a. These means 18 to regulate the distance between centers adjust the distance between centres of the upper 14a and lower 14b retaining rolls according to the thickness of the single multi-section element 12.

Figure 4:
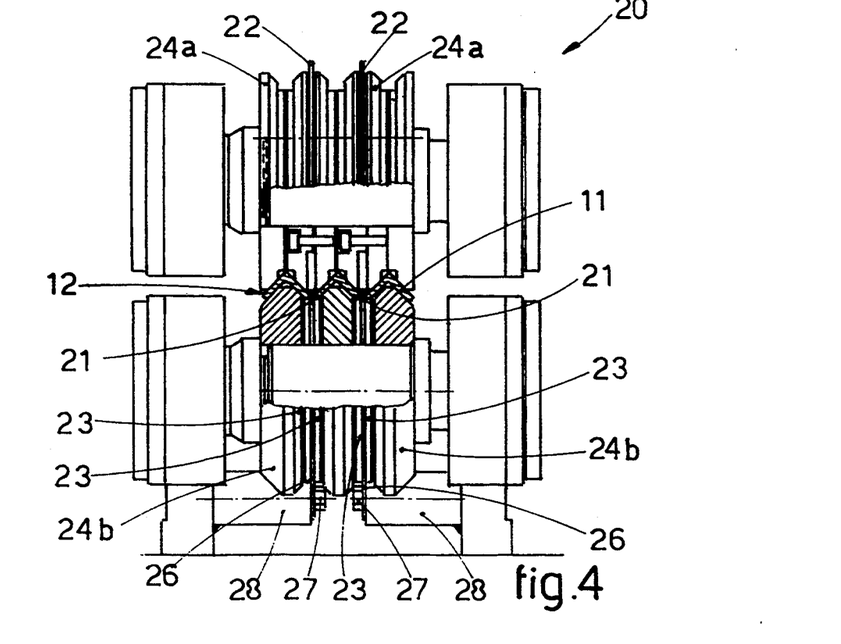
FIG. 4 shows a splitting assembly according to the invention, partly cutaway crosswise.

FIG. 4 shows a splitting assembly 20 positioned immediately downstream of the feeding and positioning assembly 36. The splitting assembly 20 may be associated with a rotary blade assembly or a scrap separation assembly 50, which separates for scrap the web 21 connecting the sections 11. The scrap separation assembly 50 may cooperate with a sack or pit 51 for the collection of waste (see FIG. 1)

The single multi-section element 12 is split in the splitting assembly 20 into the single angle irons 11 by the slitting of the connecting web 21. The splitting operation consisting in slitting the connecting web 21 by upper 22 and lower 23 rotary blades; these upper and lower rotary blades 22–23 are connected rigidly to relative upper 24a and lower 24b positioner rolls which are so shaped as to mate with the single multi-section element 12; the positioner rolls 24a–24b are actuated by actuation means, which are not shown here, being unimportant for the purpose of the invention.

Figure 5A:
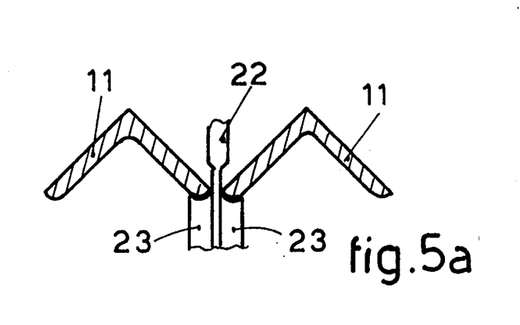
FIG. 5a shows a detail of the rotary blades with two cutting edges of the splitting assembly of FIG. 4.

FIG. 5a shows a detail of FIG. 4, namely the upper and lower rotary blades 22–23 cooperating with the single angle irons 11 at the moment of the slitting operation. The lower rotary blades 23 should be so shaped as to be able to mate with the curved lower end of the wings of the single angle iron 11.

Figures 5B, 5C:
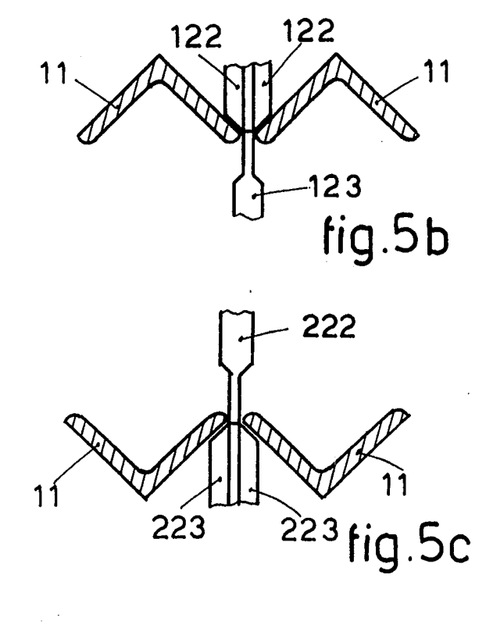

According to the variant of FIG. 5b the splitting assembly 20 comprises upper 122 and lower 123 rotary blades which do not provide for special shapings and are therefore easier to make. In this case the removal of the wastes of the web 21 is arranged from above and thus causes some difficulty.

According to a further variant shown in FIG. 5c, which is employed when the single multi-section element 12 is processed upside down as compared to the situations described above, the splitting assembly 20 comprises upper 222 and lower 223 rotary blades arranged in such a way as to enable the wastes to be removed from below.

When the splitting has been executed by the above methods, the connecting web 21 is kept whole at least along a first segment, thus assisting greatly the removal operations, and is then separated for scrap by the scrap separation assembly 50 so that the scrap can be recovered thereafter.

In this example the scrap removal operation (FIG. 9) is effected by a knife 25 to scrape swarf, which consists of a blade 26 that is inserted between the two lower rotary blades 23 so as to remove the split connecting web 21 and to convey the latter 21 towards the suitable scrap separation assembly 50.

Figure 9:
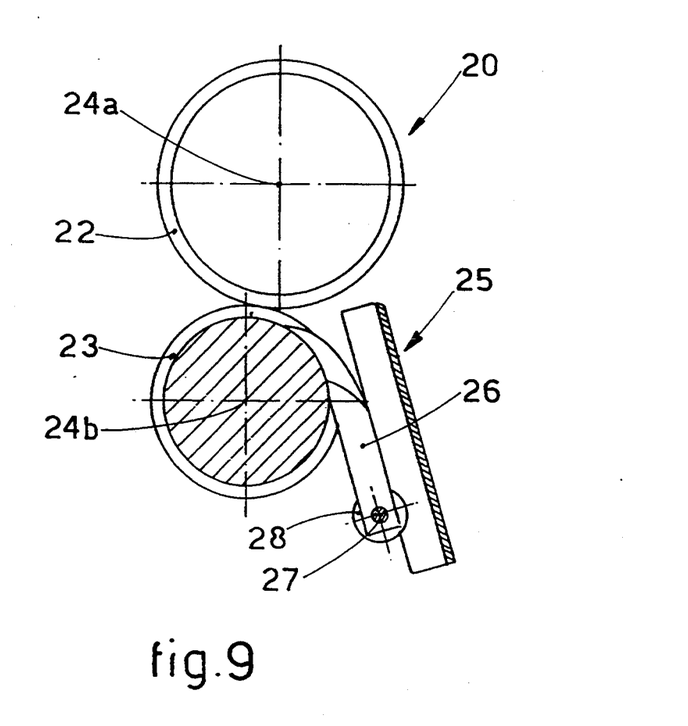
FIG. 9 is a front view of a blade to scrape swarf in cooperation with the splitting assembly of FIG. 4.

The scrap separation assembly 50 may consist, for instance, of suitable scrap shears which are able to crush the connecting webs 21 into small pieces so as to make those webs 21 easy to remove, and to convey them towards the sack 51 which collects the wastes.

In this case the scraper blade 26 is upheld by supports 23 rigidly secured to the frame of the machine 10 according to the invention (FIGS. 4 and 9).

The scraper blade 26 comprises means 27 to adjust its inclination which are suitable to adjust the inclination of the scraper blade 26 according to requirements.

Figure 6:
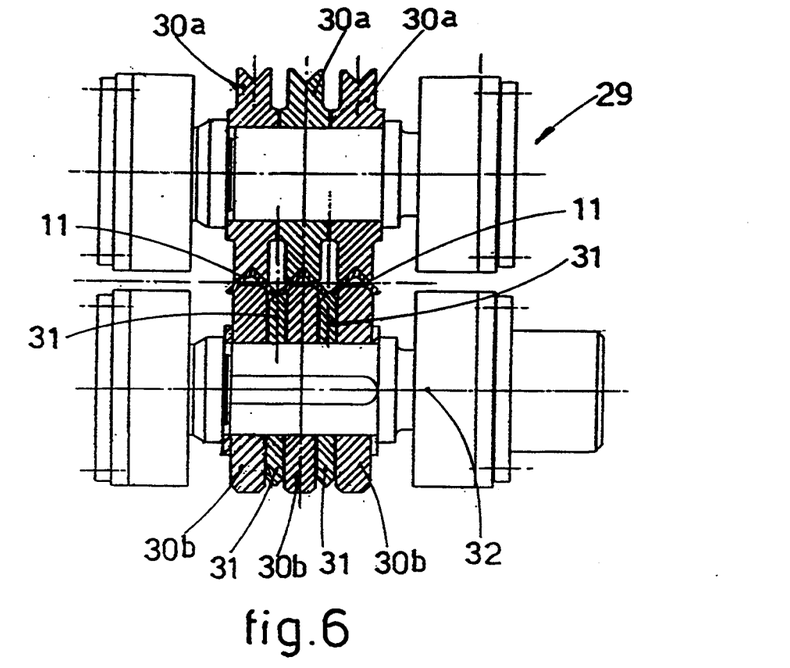
FIG. 6 show a partly cutaway re-gauging assembly according to the invention.

As a result of the splitting of the angle irons 11 from the single multi-.section element 12, the angle irons 11 generally include flash and/or pieces of connecting web 21 on their edges. So as to eliminate the flash or pieces of connecting web 21 and to shape the edges of the angle irons 11 properly, the machine 10 according to the invention includes immediately downstream of the splitting assembly 20 a re-gauging assembly 29 in which the single angle irons 11 undergo a re-shaping operation (FIG. 6).

The re-gauging assembly 29 comprises upper 30a and lower 30b re-gauging/straightening rolls shaped so as to cooperate with the surface of the angle irons 11.

The re-gauging assembly 29 may also comprise trimming rolls 31, which in this example are on the same axis as the lower re-gauging/straightening rolls 30b. The trimming rolls 31 eliminate any flash and re-form the sharp edge between the upper lateral corner of the angle iron 11 and the curved end of the wings of the same.

The trimming rolls 31 and the lower regauging/straightening rolls 30b can also be combined as one whole and may be caused to rotate about their own axis 32 by suitable actuation means, which are not shown.

According to a variant the trimming rolls 31 are associated with actuators 43 (see FIG. 11) which, by acting on the frame 47 on which the trimming rolls 31 are supported, can regulate the position of the trimming rolls 31 on a plane substantially perpendicular to the feed of the angle irons 11 and can therefore alter and adjust the trimming pressure of those rolls 31 as required.

Figure 11:
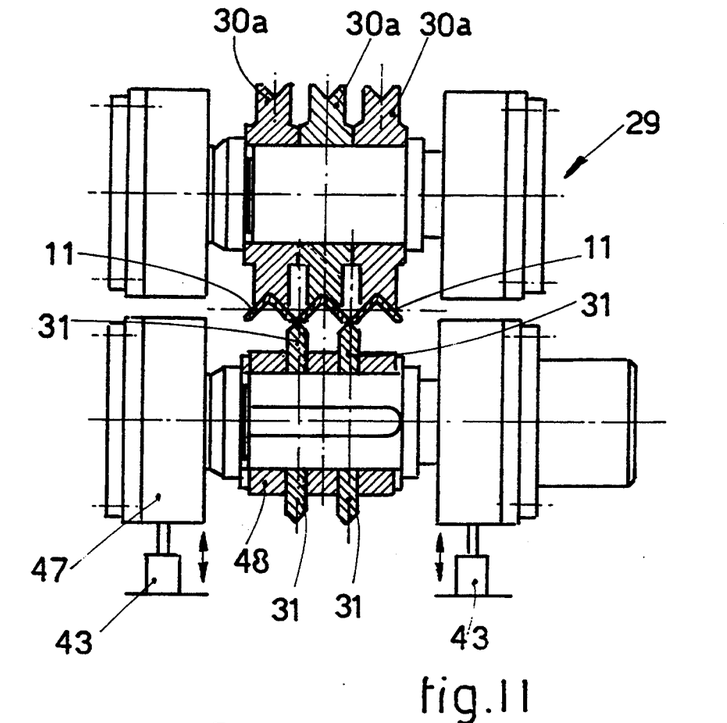
FIG. 11 shows a variant of the re-gauging assembly of FIG. 6.

The trimming rolls 31 are kept in a correct transverse position by spacers 48.

According to a further variant the re-gauging assembly 29 comprises a plurality of specially shaped, stationary tools 42 (see FIG. 12) which scrape the slitting zone from above and below and thus eliminate efficiently the flash and uneven areas which stay attached to the edges of the angle irons 11 after the slitting.

Figure 12:
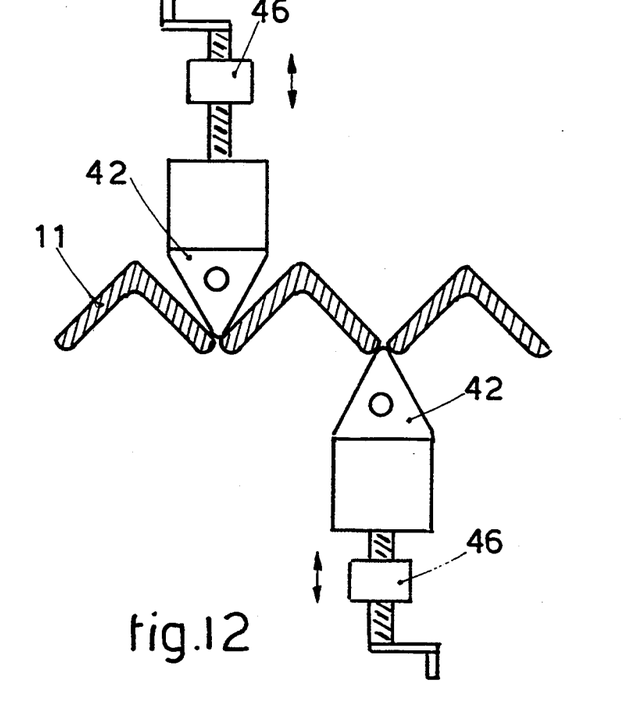
FIG. 12 shows a detail of a further variant of the re-gauging assembly of FIG. 6.

The specially shaped, stationary tools 42 are associated advantageously with regulation means 46 suitable to adjust the position of the tools 42 in relation to the angle irons 11 as required. These regulation means 46 are actuated by hand or, according to a variant, are associated with motors, which are not shown in the figures but enable the regulation means 46 to be actuated automatically.

According to the variant shown in FIG. 2b the machine 10 comprises a splitting assembly 120 fitted downstream of the feeding and positioning assembly 36 and upstream of the re-gauging assembly 29.

The splitting assembly 120 consists of two cooperating sub-assemblies 120a, 120b, one sub-assembly 120a upstream and the other 120b downstream, and enables the connecting web 21 to be slit in two successive steps by rotary blades 34 having one cutting edge.

In the upstream sub-assembly 120a (FIG. 7) rotary blades 34 act, 34a from above and 34b from below, on the connecting web 21, in this example at one edge of the lateral angle irons 11, thus leaving the connecting web 21 attached to the central angle iron 11.

Figure 8:
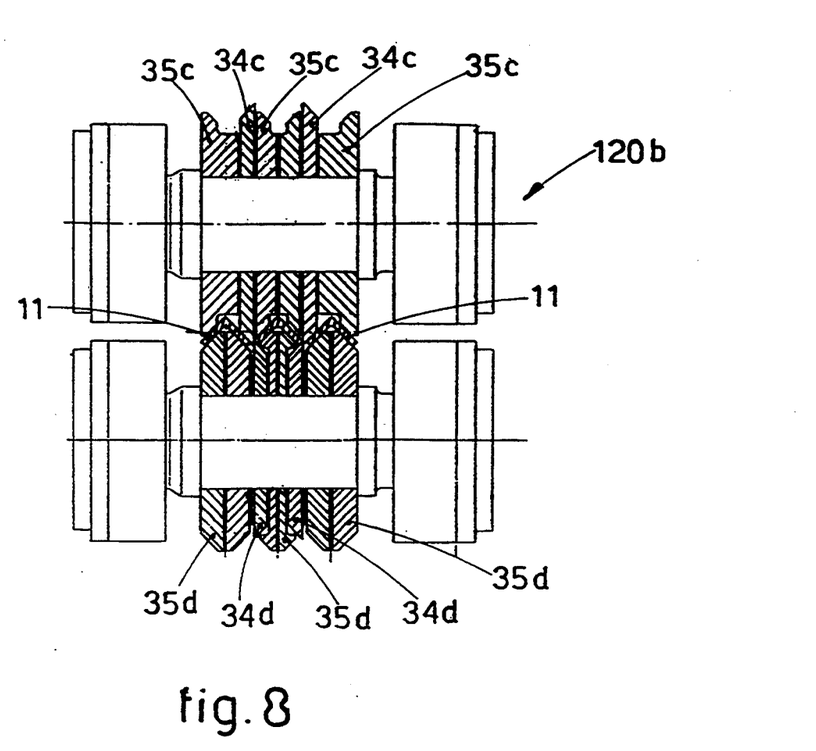

Further rotary blades 34, 34c from above and 34d from below, come into action in the downstream sub-assembly 120b (FIG. 8). These rotary blades 34c-34d slit the connecting web 21 at the edges at which the connecting web 21 is still attached, namely the edges of the central angle iron 11 in this example.

Figure 7:
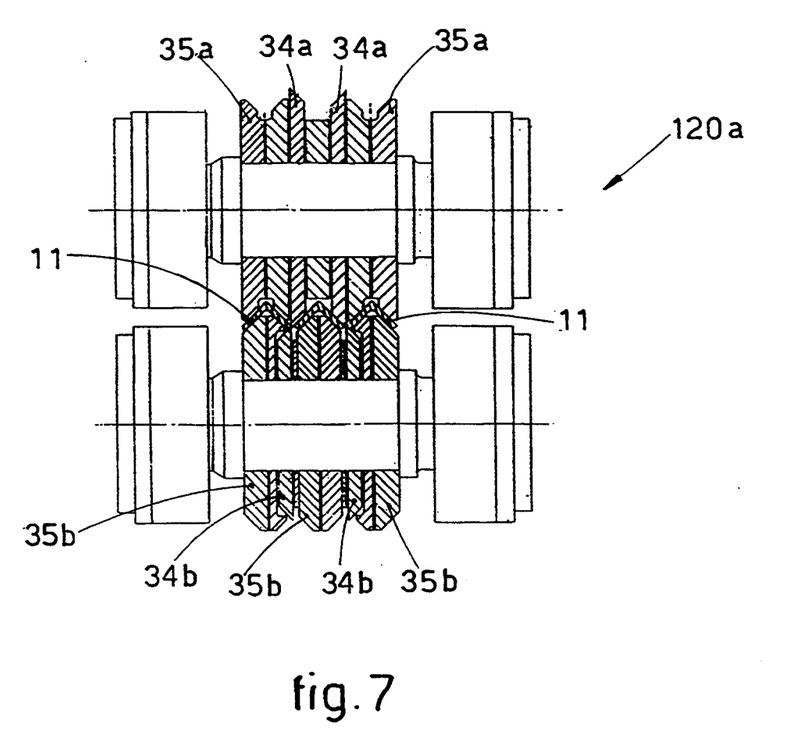
FIGS. 7 and 8 show a partly cutaway splitting assembly according to a variant of the invention.

The rotary blades 34 are connected rigidly to upper 35a-35c and lower 35b-35d positioner rolls so shaped that they mate with the single multi-section element 12; these positioner rolls 35a-35b-35c-35d are actuated by actuators, which are not shown here and are unimportant for the purposes of the invention.

The splitting assembly 120 too enables the wastes to be handled since the connecting web 21 remains united.

Figure 15:
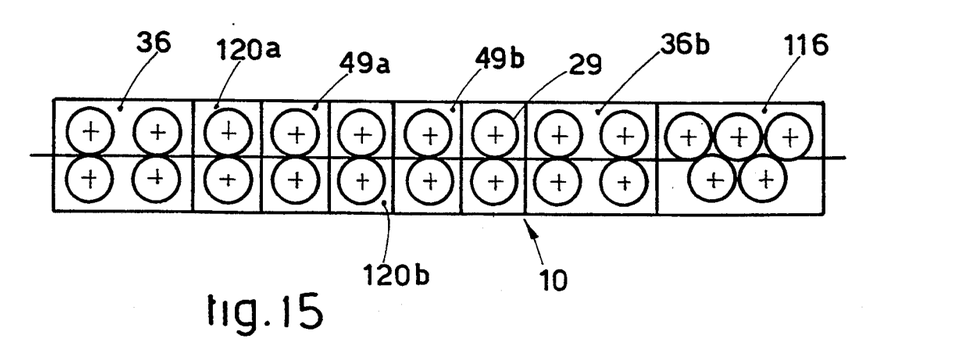
FIG. 15 is a diagram of a variant of the machine according to the invention.

According to a further variant shown diagrammatically in FIG. 15, a first guide assembly 49a is included downstream of the first splitting or slitting assembly 120a, while a second guide assembly 49b is comprised downstream of the second splitting or slitting assembly 120b.

In this case a second feeding and positioning assembly 36b and a straightening assembly 116 are included downstream of the second drawing and guide assembly 49b and the re-gauging assembly 29.

Like the feeding and positioning assembly 36, the splitting assembly 20-120 and the re-gauging assembly 29 too include threaded bolt means 18 to regulate the distance respectively between the rotary blades 22-23, 122-123, 222-223, 34a-34b and 34c-34d and between the positioner rolls 35a-35b-35c-35d and between the re-gauging/straightening rolls 30a-30b.

According to a variant which is not shown, two or more feeding and positioning assemblies 36 may be included so as to achieve more efficient pre-straightening; this variant is especially suitable where the sections are bent and/or warped.

The fact that two or more feeding and positioning assemblies 36 are available assists replacement when one feeding and positioning assembly 36 cannot be used and has to be replaced.

Figure 10A:
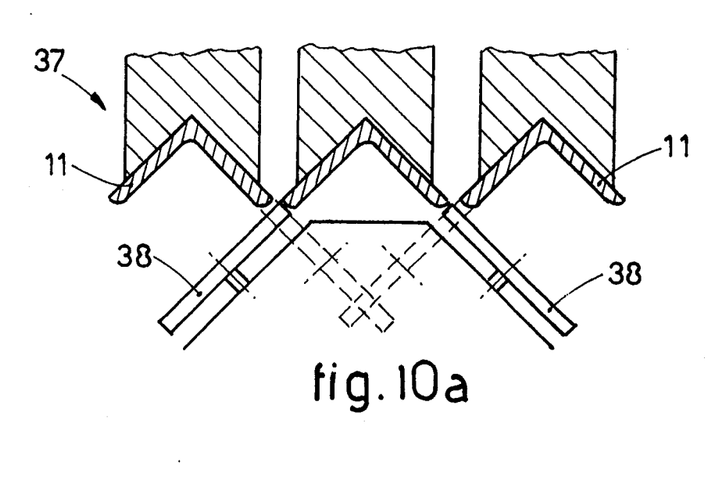
FIGS. 10a and 10b are diagrams of an auxiliary trimming assembly.
Figure 10B:
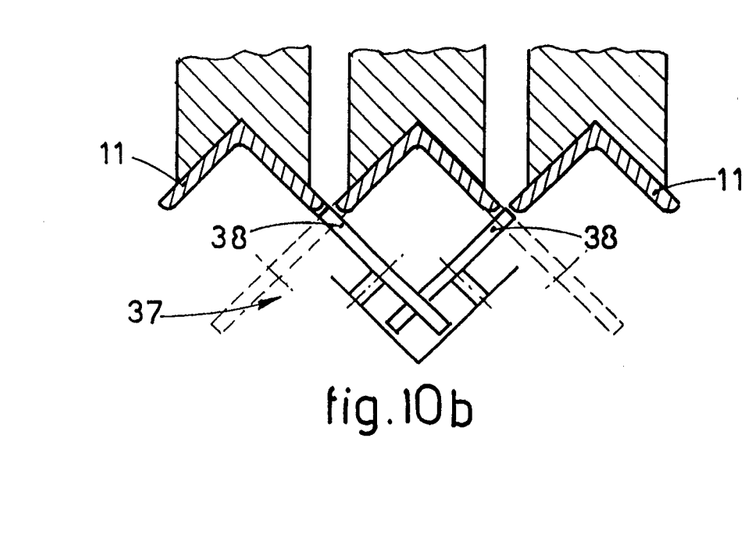

According to a further variant an auxiliary trimming assembly 37 is included as well as, or in replacement of, the re-gauging assembly 29 to achieve better forming of the single sections 11. In this case (FIG. 10) the auxiliary trimming assembly 37 includes inclined trimming rolls 38, each of which cooperates with an edge of a split angle iron 11 so as to form a sharp edge at the point where the connecting web 21 was previously attached.

In particular, FIG. 10a shows two inclined trimming rolls 38 which act on the edges of the central angle irons 11, whereas FIG. 10b shows two inclined staggered trimming rolls 38 which act on the split edges of the lateral angle irons 11.

The machine 10 according to the invention is equipped advantageously with a station 40 for changing the splitting assembly 20-120, whereby it is possible to replace quickly the rotary blades with one cutting edge 34a-34b-34c-34d or with two cutting edges 22-23-122-123-222-223 of the splitting assembly 20-120 if those blades become worn.

FIG. 1b shows a changing station 40 of a rotary type; the splitting assembly 20, when its blades are worn, is brought to position 20a, whereas, by a rotation of 180° of the platform 41 of the changing station 40, another splitting station 20 having already replaced blades and initially positioned at 20b is brought to position 20a.

According to another variant, which is not shown, the regauging assembly 29 too has an analogous changing station 40 for quick replacement of the re-gauging tools.

The first idea of the embodiment shown in FIGS. 1 arranges that a straightening machine 16 and an assembly of a known type for shearing to size 33 are included downstream of the re-gauging assembly 29.

FIG. 2 show a second idea of the embodiment of the invention, in which the machine 10 comprises only one feeding and positioning assembly 36, one splitting assembly 20 (FIG. 2a) or 120 (FIG. 2b) and one re-gauging assembly (29).

Figure 13:
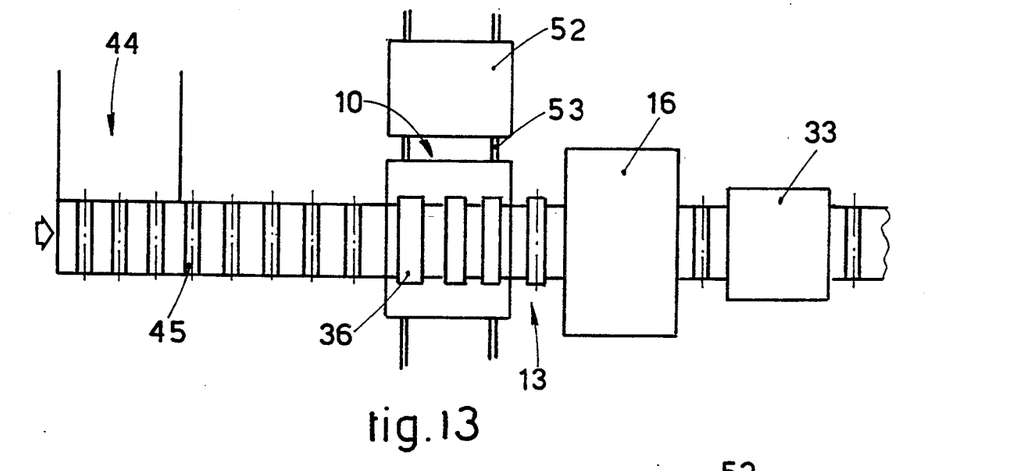
FIGS. 13 and 14 are plan views of two possible variants of FIG. 1.

According to a variant shown in FIG. 13 the machine 10 is positioned in line with a rolling mill which is not shown in the figure, and a cooling plate 44 and a feeding assembly 45, a roller conveyor in this example, are located between the rolling mill and the machine 10. A straightening machine 16 and a shears to shear to size are included immediately downstream of the machine 10.

Figure 14:
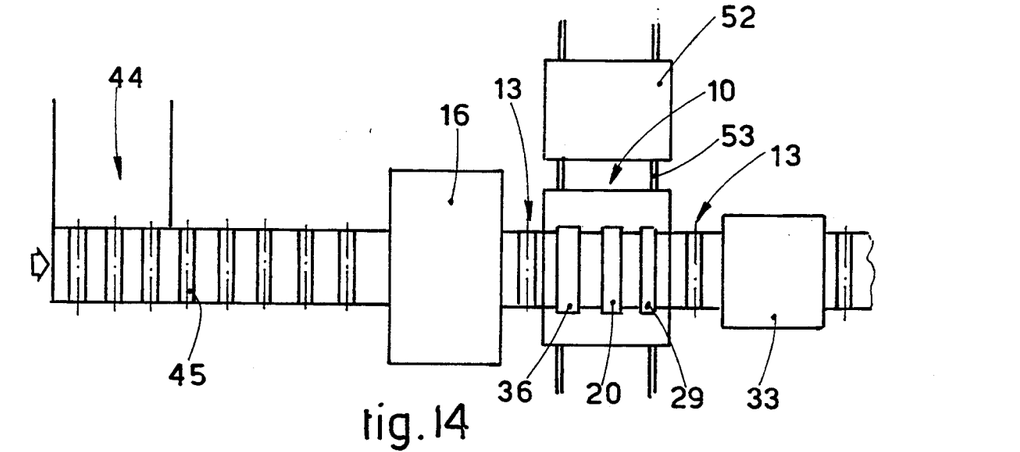

According to another variant shown in FIG. 14 the machine 10 according to the invention is located downstream of the cooling plate 44 and feeding assembly 45 and between the straightening machine 16 and the shears 33 which shears to size.

According to the embodiments of FIGS. 13 and 14 the machines 10 are capable of being displaced, on runways 53 for instance, and can be exchanged by towing means 52, towing means with magnetic tracks for example, if the multi-section elements 12 is not slit on leaving the cooling plate 44.

We claim:

1. Method to obtain in a cold state single finished non-planar sections from a substantially cold single multi-section element produced by hot rolling, drawing, the cold single multi-section element consisting of at least two finished non-planar sections positioned side by side and connected together lengthwise along a terminal part of an edge, the non-planar sections being separated by a web, the method being characterized in that the cold single multi-section element is positioned and undergoes splitting of the web from the non-planar sections, edges of the finished non-planar sections facing the web after splitting being subjected to a re-gauging operation, the finished non-planar sections being then straightened and made linear at the same time.

2. Method as in claim 1, in which the web is scrapped.

3. Method as in claim 1, in which splitting the finished non-planar sections from the web is carried out on the cold single multi-section element leaving a cooling plate.

4. Method to obtain in a cold state single finished non-planar sections from a substantially cold single multi-section element produced by hot rolling, the cold single multi-section element consisting of at least two finished non-planar sections positioned side by side and connected together lengthwise along a terminal part of an edge, the non-planar sections being separated by a web, the method being characterized in that the cold single multi-section element is straightened and made linear and then undergoes splitting of the web from the non-planar sections, edges of the finished non-planar sections facing the web after the splitting being subjected to a re-gauging operation.

5. Method as in claim 4, in which the single finished non-planar sections are straightened together after splitting of the web.

6. Method as in claim 4, in which the web is scrapped.

7. Method as in claim 4, in which splitting the finished non-planar sections from the web is carried out on the cold single multi-section element leaving a cooling plate.

8. Machine to obtain in a cold state single finished non-planar sections from a single multi-section element produced by hot rolling, the single multi-section element consisting of at least two finished non-planar sections positioned side by side and connected together lengthwise along a terminal part of an edge by a web, the machine being characterized in that it comprises in sequence at least one feeding and positioning assembly for feeding and positioning the single-multi-section element, the at least one feeding and positioning assembly comprising pairs of rolls mating with each finished non-planar section, the pairs of rolls being in a number at least equal to a number of finished non-planar sections constituting the single multi-section element, at least one splitting assembly for splitting the web and at least one re-gauging assembly for re-gauging edges of split non-planar sections.

9. Machine as in claim 8, in which a guide assembly is included upstream of the at least one feeding and positioning assembly.

10. Machine as in claim 8, in which the at least one splitting assembly comprises pairs of rolls mating with each finished non-planar section and also rotary blades providing a support for at least part of a spine of each finished non-planar section.

11. Machine as in claim 8, in which the at least one splitting assembly comprises pairs of rolls mating with at least part of each finished non-planar section, and also interposed mating rotary blades.

12. Machine as in claim 8, in which an assembly to divert scrap is included downstream of the at least one splitting assembly.

13. Machine as in claim 8, in which a straightening assembly is included downstream of the at least one splitting assembly and the at least one re-gauging assembly.

14. Machine as in claim 8, in which the at least one re-gauging assembly includes at least one of trimming and re-gauging rolls.

15. Machine as in claim 8, in which the at least one re-gauging assembly includes adjustable removal tools.

16. Machine as in claim 8, in which a speedy replacement station is included at a side of the at least one splitting assembly.

17. Machine as in claim 8, in which a speedy replacement station is included at a side of the at least one re-gauging assembly.

18. Machine as in claim 8, in which an assembly to scrap wastes is included in cooperation with the at least one splitting assembly.

19. Machine as in claim 8, which is positioned immediately downstream of the plate which cools the multi-section elements.

20. Machine as in claim 8, which is positioned upstream of a straightening machine.

21. Machine as in claim 8, which is positioned downstream of a straightening machine.

22. Machine as in claim 8, which is associated with a towing means and reciprocal replacement means.

* * * * *

UNITED STATES PATENT AND TRADEMARK OFFICE
CERTIFICATE OF CORRECTION

PATENT NO.  :  5,400,631
DATED       :  March 28, 1995
INVENTOR(S) :  BENEDETTI, et al It is certified that error appears in the above-identified patent and that said Letters Patent is hereby corrected as shown below:

On title page, item:

[75]: Inventors:

"Alfredo Polino" should read --Alfredo Poloni--.

Signed and Sealed this

Thirtieth Day of May, 1995

*Attest:*

BRUCE LEHMAN

*Attesting Officer*      *Commissioner of Patents and Trademarks*